United States Patent Office 3,642,906
Patented Feb. 15, 1972

3,642,906
MANUFACTURE OF BENZOPHENONE
Samuel Kahn, Rutherford, N.J., assignor to Universal Oil Products Company, Des Plaines, Ill.
No Drawing. Filed Nov. 26, 1969, Ser. No. 880,412
Int. Cl. C07c 49/76
U.S. Cl. 260—591    8 Claims

ABSTRACT OF THE DISCLOSURE

Manufacture of a benzophenone by the oxidation of a diphenylmethane in contact with a catalyst consisting of a naphthenic acid salt or a $C_6$–$C_{20}$ aliphatic acid salt of certain metals. The invention is exemplified by the oxidation of diphenylmethane to benzophenone in contact with copper naphthenate catalyst.

BACKGROUND OF THE INVENTION

The classic method of manufacturing benzophenone entails the use of aluminum chloride catalyst. For example, benzoyl chloride and benzene are reacted in the presence of aluminum chloride catalyst. However, the aluminum chloride must be used in concentrations greater than molar amounts because of the formation of complexes. This, in turn, entails additional treatment to decompose the aluminum chloride complex. To avoid the above objections, it has been proposed to prepare benzophenone by the direct oxidation of diphenylmethane. Various catalysts have been suggested but apparently the proposed processes are not entirely satisfactory.

DESCRIPTION OF THE INVENTION

It now has been found that benzophenone is readily prepared by the oxidation of diphenylmethane when effected in the presence of certain catalysts. As will be demonstrated by the appended examples, good yields of benzophenones are obtained without the disadvantages encountered in the prior art processes.

Benzophenone possesses various utilities. It is especially useful in perfumery, both to impart floral odors and also as a fixative. Benzophenone also is used in organic synthesis. Various derivatives thereof are used as ultraviolet light absorbers, flavors, drug intermediates, polymerization inhibitors for styrene, etc.

While the present invention is particularly useful for the manufacture of benzophenone, it is understood that it also may be used for the preparation of substituted benzophenones. The process may be illustrated by the following equation:

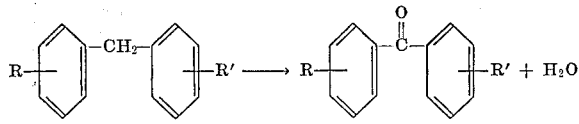

where R and R' are hydrogen, hydrocarbyl, hydrocarbyloxy or halogen radicals.

Where R and R' are hydrogen, the charge is diphenylmethane and the product is benzophenone. When R and/or R' are hydrocarbyl, the hydrocarbyl is selected from alkyl of 1 to 20 carbon atoms, aryl and particularly phenyl or substituted phenyl, and cycloalkyl containing from 3 to 12 carbon atoms in the ring or substituted cycloalkyl. The substituents on the aryl or cycloalkyl substitutions preferably are alkyl of from 1 to 20 carbons. Where R and/or R' are hydrocarbyloxy, it is selected from alkoxy, aralkoxy, aryloxy, alkylaryloxy, cycloalkoxy and alkylcycloalkoxy, the alkyl, aryl and cycloalkyl moieties being selected from those hereinbefore set forth. Where R and/or R' are halogen, it will be selected from chlorine, bromine, iodine or fluorine. It is understood that any suitable substituted diphenylmethane may serve as charge for oxidation in accordance with the present invention.

The oxidation is effected in the presence of free oxygen and conveniently comprises air. However, it is understood that free oxygen or other suitable source of free oxygen may be used in accordance with the present invention. The oxygen is used in at least stoichiometric proportions. Generally, however, an excess of oxygen may be employed which may range up to 3 or more mole proportions above stoichiometric requirements. However, a too large excess of oxygen should not be used in order to avoid excessive oxidation.

As hereinbefore set forth, the oxidation is effected in the presence of a particular type of catalyst. The catalyst for use in the present invention is a naphthenic acid salt or a $C_6$–$C_{20}$ aliphatic acid salt of a metal in Group I–B, VII–B or VIII of the Periodic Table or of cerium. These metals comprise copper, silver, gold, manganese, rhenium, iron, cobalt, nickel, ruthenium, rhodium, palladium, osmium, iridium and platinum. Preferred metals comprise copper, cobalt, manganese and cerium.

The naphthenates include hydroxynaphthenates. The $C_6$–$C_{20}$ aliphatic acid salts include the hexanoates, heptanoates, octanoates (octoates), nonanoates, decanoates, undecanoates, dodecanoates, tridecanoates, tetradecanoates, pentadecanoates, hexadecanoates, heptadecanoates, octadecanoates, nonadecanoates and eicosanoates, which may be straight or branched chain. The straight chain salts conveniently are derived from fatty acids and thus include the caproates, caprylates, capricates, laurates, myristates, palmitates, stearates, etc.

Some of these salts are available commercially or they may be prepared in any suitable manner. However, it is understood that the different salts are not necessarily equivalent and that the particular salt will be selected with reference to the particular diphenylmethane charge and also on the particular temperature employed. These salts are used in catalytic amounts and, as will be shown in the appended examples, as low as 1 gram of the salt is satisfactory for effecting the oxidation of 500 g. of diphenylmethane.

In another embodiment a mixture of salts may be used. The mixture may comprise, for example, a naphthenic acid salt and an aliphatic acid salt of the same metal, or different aliphatic acid salts of the same metal, or naphthenic acid salts and/or aliphatic acid salts of one or more different metals selected from those hereinbefore set forth.

The oxidation is effected at any suitable temperature and pressure. The temperature will be in excess of 100° C. and generally will be within the range of from about 130° to about 250° C., although a lower or a higher temperature may be used in some cases. Any suitable pressure is employed and may range from subatmospheric to 200 pounds per square inch or more.

The process is effected in any suitable flow system, which may be batch or continuous type of operation. In a batch type operation the diphenylmethane is charged into a reaction zone equipped with heating and mixing means. Oxygen and preferably air is charged into the lower portion of the reaction zone and thus serves the additional purpose of effecting mixing. Vaporous products are removed from an upper outlet line and preferably through a reflux condenser which serves to return unconverted diphenylmethane back to the reaction zone. In still another embodiment, the reaction zone may comprise a rotating autoclave or the like.

The time of reaction is sufficient to effect the desired oxidation and may range from 1 hour to 36 hours or more and generally will be within the range of from 4 to 24 hours. When desired, the reaction zone may contain provision for the introduction of additional catalyst during the course of the run. Following completion of the reaction, the reaction mixture is allowed to cool and the benzophenone is separated from unreacted diphenylmethane in any suitable manner. In a preferred method the reaction mixture is fractionated under vacuum to separate a benzophenone concentrate and the concentrate is subjected to saponification to saponify phenylbenzoate which may be present and also to remove any free benzoic acid and phenol which may be present in the reaction mixture. The saponification may be effected in any suitable manner and readily is effected by reacting with an alkali metal hydroxide, preferably sodium hydroxide or potassium hydroxide. The alkali metal hydroxide will be used in at least a stoichiometric amount based upon the phenylbenzoate, benzoic acid and phenol present in the reaction mixture. The saponification conveniently is effected by refluxing the benzophenone concentrate with aqueous sodium hydroxide solution.

Following the saponification, the benzophenone is recovered in any suitable manner, including water washing, extracting with an aromatic hydrocarbon as benzene, toluene, xylene, etc. and then fractionating to remove the aromatic hydrocarbon and to recover the benzophenone product.

The following examples are introduced to further illustrate the novelty and utility of the present invention but not with the intention of unduly limiting the same.

EXAMPLE I

The diphenylmethane used as charge in this example was prepared by charging 7254 g. of benzene and 13.5 g. of powdered anhydrous aluminum chloride into a 12 liter flask and then adding with mixing at 40° C. over a period of 3 hours a mixture of 900 g. of benzene and 900 g. of benzyl chloride. The reaction mixture was further mixed for 1½ hours at 40° C., then quenched with 300 cc. of water, causing the temperature to rise to 47° C. Mixing was continued for an additional ½ hour, after which a clear bottom water fraction was separated. Soda ash (5 g.) was added to the washed crude product and the benzene then was removed by distillation under water pump vacuum. The resulting crude product was filtered to remove trace amounts of salts and to separate the crude diphenylmethane as a clear liquid. Analysis by GLC indicated a purity of over 90%.

The crude diphenylmethane prepared in the above manner was used as charge for oxidation in an apparatus comprising a 1 liter flask (reactor) equipped with a stainless steel mixing blade and heated by a variac controlled glas-col heating mantle. The flask is additionally provided with a tube to conduct air into the bottom of the reactor and with a vapor outlet coil condenser, where most of the oil and water is returned to a Bidwell device in which water is separated from the oil and the latter is continuously returned to the reaction flask. During the course of the reaction, the mixture in the Bidwell device increases in gravity and separation becomes difficult. To facilitate separation, a small amount of toluene or benzene is added via a funnel provided for the purpose.

In the present run, 500 g. of crude diphenylmethane was loaded into the flask together with 2 g. of copper naphthenate. The copper naphthenate was supplied as a viscous liquid and contains 80% copper naphthenate and 20% petroleum distillate. The flask was heated with mixing to 185° C. and air was introduced into the lower portion of the flask at a rate of 750 cc. per minute. The run continued for a total of 21 hours with overnight shut-downs, at which point oxygen consumpton dropped and the diphenylmethane was almost completely reacted. A total of 62 cc. of water was collected. During the run, 4 cc. of benzene periodically was added to the Bidwell device and subsequently passed into the reactor flask. Following completion of the reaction, the benzene was removed by vacuum distillation to about 3 mm. and about 80° C. in pot followed by vacuum distillation of a crude distillate to 250° C. pot temperature. The crude distillate then was saponified with sodium hydroxide and fractionated to separate a main fraction which analyzed 99.8% benzophenone by GLC. The yield and conversion of benzophenone produced in the reaction is 72.8% of theoretical based on the diphenylmethane charged.

EXAMPLE II

Another run was made in substantially the same manner as described in Example I except that the air rate was increased to 1200 cc. per minute and only 1 g. of copper naphthenate catalyst was used. Toluene instead of benzene was added to the Bidwell device. Following work up in substantially the same manner as described in Example I, the yield and conversion of the benzophenone amounted to 72.0% of theory based on the diphenylmethane charged.

EXAMPLE III

Another run was made in substantially the same manner as described in Example I except that the catalyst consisted of 1 g. of copper naphthenate and 1 g. of cerium naphthenate. The reaction started at a temperature of 145° C. with an air rate of 2500 cc. per minute. The air rate was cut to 1500 cc. per minute and the temperature raised gradually to 220° C. The theoretical amount of water was recovered in 20 hours. The yields and products were comparable to those produced in Example I.

EXAMPLE IV

The catalyst used in this example was cobalt octoate. The catalyst was used in an amount of 2 g. in a run made in the manner similar to that described in Example I except that the reaction was terminated before completion. The yield of benzophenone was 79.5% based on reacted diphenylmethane. However, the percent conversion was about 29% based on diphenylmethane charged.

EXAMPLE V

Another run was made in substantially the same manner as described above except that the catalyst comprised cobalt naphthenate and an additional 2 g. of catalyst was added during the run. The temperature was increased from 180° C. after about 6½ hours to 220° C. The benzophenone amounted to 73% yield and the conversion was 54.6%.

EXAMPLE VI

Another run was made in the same manner as described above but the catalyst comprised cobalt hydroxynaphthenate. The reaction was started with 1 g. of catalyst and an air rate of 1200 cc. per minute at a temperature of 110° C. However, the temperature was increased to 220° C. and an additional 1 gram of catalyst was added during the run. The air rate was reduced to 750 cc. per minute. After 28 hour reaction period, the theoretical amount of water was recovered. The yield of benzophenone amounted to 76.8% and the conversion was 69.8%.

EXAMPLE VII

The catalyst used in this example was cerium naphthenate. It was obtained commercially and said to contain 6% cerium (ceric). The reaction was started at 135° C. and an air rate of 750 cc. per minute. The temperature was gradually increased to 185° C. The air flow rate also was increased to 1500 cc. per minute. After 7 hours the yield of benzophenone was 76.5% and the conversion was 32.8%.

EXAMPLE VIII

Another run was made in the same manner as described in Example I except that the catalyst was manganese naphthenate which was used in a concentration of 2 grams. The manganese napthenate was obtained commercially and contained 6% manganese as the metal. Substansailly similar benzophenone yields were obtained as described in the previous examples.

EXAMPLE IX

In this example, p,p'-dimethyldiphenylmethane is oxidized in substantially the same manner as described in Example I in the presence of the copper naphthenate catalyst. The resulting product is p,p'-dimethylbenzophenone.

EXAMPLE X

As hereinbefore set forth benzophenone is particularly useful as a perfume ingredient. A suggested recipe for a rose perfume is as follows.

| Ingredients: | Parts by wt. |
|---|---|
| Citronellol | 45 |
| Citronellyl acetate | 6 |
| Benzophenone | 5 |
| Nerol | 10 |
| Linalool | 5 |
| Hydroxy citronellal | 10 |
| Phenylethyl alcohol | 3 |
| Phenylethyt dimethyl acrylate | 3 |
| Oil bois de rose | 8 |
| Isoeugenol | 0.5 |
| Oil caraway | 0.5 |
| Aldehyde C-9, 10% alc. | 0.5 |
| Isomethol | 1.5 |

I claim as my invention:

1. In the oxidation of diphenylmethane or $C_1$ to $C_{20}$ alkyl substituted derivative thereof to the corresponding benzophenone, the process of effecting said oxidation at a temperature of from about 130° to about 250° C. in contact with a catalyst consisting of copper naphthenate, cerium naphthenate, cobalt naphthenate, manganese naphthenate, corresponding hydroxy naphthenate, or mixture thereof.

2. The process of claim 1 in which diphenylmethane is oxidized to benzophenone.

3. The process of claim 1 in which said metal is copper.

4. The process of claim 3 in which said catalyst is copper naphthenate.

5. The process of claim 1 in which said metal is cobalt.

6. The process of claim 5 in which said catalyst is cobalt naphthenate or cobalt hydroxynaphthenate.

7. The process of claim 1 in which said metal is manganese.

8. The process of claim 1 in which said metal is cerium.

References Cited

UNITED STATES PATENTS

| 2,806,059 | 9/1957 | Bruson et al. | 260—591 |
| 2,859,247 | 11/1958 | Radzitzky et al. | 260—591 |
| 3,424,789 | 1/1969 | Schulz et al. | 260—591 |
| 2,245,528 | 6/1941 | Loder | 260—592 |
| 2,788,367 | 4/1957 | Bills et al. | 260—592 |

OTHER REFERENCES

Chemical Abstracts, 65 index, A–I p. 766S (1966).
Chemical Abstracts 7th collective index 5208S (1962–1966).
Scipioni et al.: Chemical Abstracts 58, 4443c (1963).
Rocek, Chemical Abstracts 70, 233, 28088d (1969).

DANIEL D. HORWITZ, Primary Examiner

U.S. Cl. X.R.

252—431